Patented Jan. 25, 1949

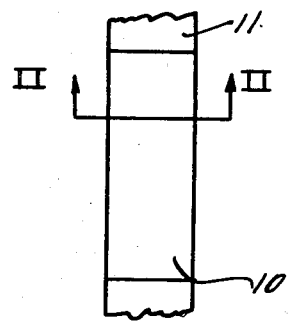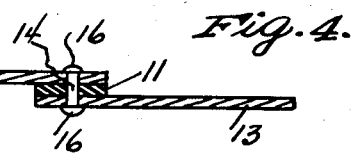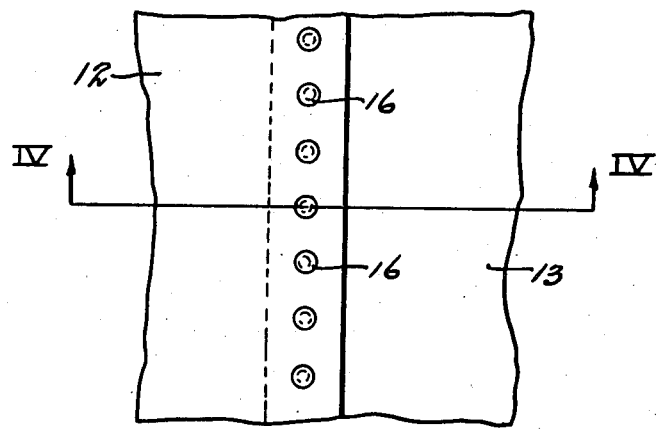
INVENTOR.
WALLACE P. MARSHALL
ATTORNEY

2,460,181

UNITED STATES PATENT OFFICE 2,460,181

SEALING MATERIAL

Wallace P. Marshall, Newark, N. J., assignor to Pittsburgh Plate Glass Company, Essex County, N. J., a corporation of Pennsylvania Application June 17, 1944, Serial No. 540,851

5 Claims. (Cl. 154—53.5)

The present invention relates to sealing or caulking materials suitable for use in closing the joints between the parts of composite structures. It has particular relation to a caulking of sealing material, preferably in the form of a tape, suitable for use in closing the joints in such structures as pressurized cabins, fuel tanks, hulls and pontoons and other parts of structures and devices employed in the fields of air, marine or land transportation. However, its use is not limited to these fields since the material is applicable to the sealing of the joints of numerous other structures where plastic sealing material of tape form is desirable.

One object of the invention is to provide a material which, when sandwiched into a joint between a plurality of parts in a composite structure, retains its life and flexibility over long periods of time.

A second object is to provide a caulking or sealing tape which is easy of application and which adheres readily, firmly and permanently to the surfaces at the joints to be sealed.

A third object is to provide a material which is inert and insoluble in most agencies, such as water, gasolene and the like, with which the material is likely to contact.

These and other objects of the invention will be apparent from consideration of the claims and specification.

For a better understanding of the invention, reference may now be had to the accompanying drawings, in which like numerals refer to like parts throughout.

In the drawings,

Fig. 1 is a fragmentary view of a sealing material in the form of a tape embodying the principle of the invention;

Fig. 2 is a sectional view taken substantially upon the line II—II;

Fig. 3 is a fragmentary plan view of two parts of a composite structure sealed together by a tape embodying the invention; and Fig. 4 is a fragmentary sectional view upon the line IV—IV of Fig. 3.

It has long been customary to apply a plastic material to the joints of composite structures in order to render them fluid-tight. Putty, such as is employed in glazing, constitutes one of the most common of these materials. It is composed of a relatively inert pigment such as whiting in admixture with an oxidizing or drying oil such as linseed oil. Putty is relatively inexpensive and is fairly efficient in rigid structures, such as windows, where it is not subjected to any appreciable degree of pressure, flexing or stretching. However, it is subject to relatively rapid deterioration through embrittlement and subsequent cracking. In its later stages of embrittlement, its adherence to the surfaces with which it contacts is comparatively low. Putty, likewise, is often soluble to a greater or lesser degree in gasolene and such like solvents. It is also a dough-like composition which is adapted for application only spreading lumps with a blade, a slow manual operation in which uniformity is hard to attain. Naturally, a dough-like material, if applied between overlapping surfaces where it is subjected to pressure, tends, while it is fresh, to squeeze out. For these reasons, this material is not practical as a caulking material for use in the joints of such structures as pressurized cabins for high altitude airplanes, for fuel tanks in airplanes, boats and vehicles, for pontoons and floats, or for other structures where the parts are likely to be subjected to pressure or flexing or to slight relative movement with respect to each other, or where the joints may be subjected to gasolene, water or other agencies of solvation or hydrolization.

The present invention involves the provision of a caulking material comprising a compound which is chemically inert, resistant to gasolene, water and the like, flexible and capable of being sheeted into tape that can be applied with ease and great uniformity even by unskilled labor. The material comprises, as main ingredients, an alkyd resin zinc chromate, a vinyl resin and a filler.

The alkyd resin should be non-oxidizing and is a product of a polybasic acid such as phthalic, succinic, sebacic, azaleic, etc. and polyhydric alcohol such as glycerol, glycol, etc. It may also include modifiers such as fatty acids, e. g. stearic acids, lauric acid, palmitic acid, oleic acid and similar acids, or the glycerides of such acids. Preferably, the acids or glycerides are non-drying or at least do not oxidize readily. Likewise they may and preferably do include plasticizers for the resins, such as neutral phthalic acid esters or other conventional plasticizers. The compounding and preparation of these alkyd type resins within themselves is well understood by those skilled in the art, and it is not deemed necessary to dwell upon such process in the description of the present invention.

The alkyd resin preferably is employed in a degree of polymerization short of the final infusible, insoluble state. That is, it should still be sufficiently thermoplastic or fusible to admit of its being milled with the other ingredients in the material.

The second main ingredient of the composition, namely the chromate compound of pigmentary nature, notably zinc chromate is incorporated in a ratio approximately within the range of 5 to 30 percent, based upon the alkyd resin employed.

The third ingredient e. g. thermoplastic vinyl resin is insoluble in gasolene or the like fuels commonly employed in airplane and land vehicles and is not readily hydrolizable by water. The vinyl resins include the vinyl acetals, such as the vinyl butyral, commonly employed as a reinforcing and bonding layer in safety glass, vinyl chloride and the copolymers obtained from vinyl acetate and vinyl chloride and commonly sold under the trade name Vinylite VYHH. In this composition, the vinyl chloride may constitute approximately 60 to 90 percent, the remainder being the vinyl acetate.

The composition may but does not necessarily include a polymer of a conjugate diene hydrocarbon or a derivative of such diene hydrocarbon, such as the chloro substituted diene hydrocarbons. These materials are of the nature of synthetic rubber.

The vinyl resin is employed in a ratio of about 20 to 40 percent based upon alkyd resin content. The filler may be any inert, porous material such as asbestos fibers, cotton or wood fibers, spun glass or the like. It is employed in an amount to impart desired consistency to the compound, e. g. 100 to 250 percent based upon the alkyd resin content.

The following constitute specific examples of formulations suitable for use in the practice of the invention:

Example I

Approximately 320 lbs. of polybasic acid-polyhydric alcohol synthetic resin; 545 lbs. asbestos fiber; 22 lbs. of zinc chromate; 75 lbs. of polyvinyl butyral resin, and 37.5 lbs. of dibutyl phthalate were placed in a suitable mixing apparatus, such as a Banbury mixer or a rubber mill, and were subjected to thorough intermixing for 20 minutes at a temperature approximately within a range of 180 to 210° F. When the material was sufficiently mixed, it was sheeted out between calender rolls to a desired thickness e. g. 10 to 25 thousandths of an inch upon a suitable backing, such as holland cloth or a sheet of non-adherent synthetic plastic. The sheeted material may be formed of a width corresponding to that of the desired caulking tape e. g. 1 or 2 inches, or it may be sheeted out to a width which can be split into a plurality of tapes. These tapes, of course, are rolled up for convenience in handling.

Example II

Approximately 320 lbs. of polybasic acid-polyhydric alcohol synthetic resin was admixed with 490 lbs. of filter, such as asbestos fiber; 63 lbs. of zinc chromate; 105 lbs. of polyvinyl acetate chloride resin and 52 lbs. of dioctyl phthalate at a temperature of about 180 to 200° F., upon a Banbury or rubber mill. The material was then sheeted out in the form of tapes similar to those above described.

Example III

About 320 lbs. of polybasic acid-polyhydric alcohol synthetic resin; 540 lbs. of asbestos fiber, 25 lbs. of zinc chromate; 69 lbs. of polyvinyl chloride and 46 lbs. of Buna N type synthetic rubber (the product of polymerization of butadiene and 25 percent acrylonitrile) were intimately mixed as above described and were then sheeted and rolled with a backing element.

The foregoing examples of compositions, of course, are merely illustrative. It will be apparent that substantial departures may be made therein without departure from the spirit of the invention.

If desired, the caulking compositions can be sheeted out without the use of a non-adhesive backing layer and in order to prevent adhesion to the sheet when it contacts with itself in a rolling operation, it may be dusted at least upon one side with a parting agent such as sodium carbonate, which can be dissolved away by a simple washing operation with water prior to use of the tape. Application of other coating materials such as paraffine or other wax which can be removed by washing the sheet prior to use with gasolene or other solvent is also contemplated.

In the drawings, Figs. 1 and 2 illustrate sections of tape embodying backing layers of a non-adhesive material such as holland cloth. In these figures, a layer of the caulking material is indicated at 10 and embodies a composition prepared as described in any one of the foregoing examples or in any similar manner. The backing layer 11, as previously stated, may be of holland cloth or other material having only a slight tack with respect to the caulking material and being designed to be stripped away preparatory to use of the material.

The application of a caulking tape of this character is shown in Figs. 3 and 4, in which the tape 10 is sandwiched between two parts 12 and 13 which may be of substantially any material e. g. sheet aluminum, sheet steel or an alloy of appropriate composition. The parts 12 and 13 may be the edges of a sheet or sheets of metal forming a pressurized cabin of an airplane, a fuel tank, a float, wings of an airplane, or any other appropriate elements of a device for transportation or other structure embodying joints which it may be desirable to seal or caulk. The overlapping portions of the parts 12 and 13 are appropriately mechanically secured together for example by means of rivets 14 piercing the edges of the parts and having opposite head portions 16 securing the rivets in place. Of course, rivets may be replaced by bolts or screws if so desired.

In applying the caulking tape or strip 10, a convenient procedure involves merely pressing the exposed side of the outer end of a tape to one of the elements, the edges of which are to be joined, contiguously to an edge. Slight pressure upon the material is sufficient to tack the plastic to the surface. The tape can be unrolled along the entire edge and tacked in place by slight pressure. The backing layer 11 can be stripped off either simultaneously with the unrolling of the tape or after it has been tacked in place. Assuming that the tape is laid down and tacked along the edge of the element 13 and the element 12 is superposed thereupon, the rivets 14 may then be inserted in suitable openings in the elements and headed down in accordance with conventional procedure.

It will be apparent that the tape as herein disclosed retains its plasticity, flexibility and adherence to the surfaces with which it contacts over extended periods of time. The tape will yield and bend in accordance with the flexures or movements of the parts which are secured together without cracking or breaking and without becoming loosened from the surface to which it adheres or being squeezed out. Also, the material resists hydrolization by water and dissolution with any ordinary solvent material such as gasolene and fuel oil with which it is likely to come in contact. As previously indicated, the use of the materials herein disclosed in the form of tapes of appropriate width and thickness is particularly desirable since it is much more expeditious so to apply the materials in uniform layers to the surfaces to be sealed together. However, it is apparent that if so desired, it is also possible to apply the material like putty with a suitable spreading tool such as a blade or the like.

It is to be understood that the forms of the invention herein disclosed are merely exemplary. It will be apparent to those skilled in the art that numerous modifications may be made therein without departure from the spirit of the art or the scope of the appended claims.

What I claim is:

1. An adhesive sealing tape for interposition between the overlapping edge portions of two sheets of metal which are joined together by mechanical fastening elements, which tape comprises a mixture of a non-drying alkyd resin in a fusible, soluble stage, said resin being the polyester of a polyhydric alcohol and an unsaturated dicarboxylic acid, a water resistant vinyl resin of a class consisting of vinyl acetal, vinyl chloride and copolymers of vinyl acetate and vinyl chloride, zinc chromate, and a filler material, the zinc chromate being employed approximately in a ratio of 5 to 30%, based upon the alkyd resin content and the vinyl resin being in a ratio of 20 to 40%.

2. A tacky sealing tape for interposition between and adherence to overlapping portions of two sheets of metal which are to be joined together by mechanical fastening elements, which tape comprises a layer of a mixture of a non-drying, heat fusible and soluble alkyd resin which is a polyester of a polyhydric alcohol and a saturated dicarboxylic acid, zinc chromate, a water resistant vinyl resin of a class consisting of vinyl acetal, vinyl chloride and a copolymer of vinyl chloride and vinyl acetate, the zinc chromate being employed in a ratio of approximately 5 to 30%, the vinyl resin being in a ratio of 20 to 40% based upon the alkyd resin content, said layer further comprising 100 to 250% based upon the alkyd resin content of an inert filler, the layer further being superposed upon a backing layer from which said layer is adapted to be stripped from the tape to expose the surfaces thereof.

3. A sealing tape as defined in claim 2 in which the first mentioned layer further comprises synthetic rubber.

4. A sealing tape as defined in claim 2 in which the first mentioned layer further comprises a plasticizer for the alkyd resin.

5. A sealing tape as defined in claim 2 in which the filler comprises asbestos.

WALLACE P. MARSHALL.

REFERENCES CITED

The following references are of record in the file of this patent:

UNITED STATES PATENTS

| Number | Name | Date |
|---|---|---|
| 2,036,009 | Wright | Mar. 31, 1936 |
| 2,119,280 | Kronquest | May 31, 1938 |
| 2,144,067 | Kranszlein | Jan. 17, 1939 |
| 2,195,362 | Ellis | Mar. 26, 1940 |
| 2,208,619 | Armor et al. | July 23, 1940 |
| 2,280,242 | Kropa | Apr. 21, 1942 |

OTHER REFERENCES

New Plasticizer Useful in Synthetic Rubber, Chemical and Eng. News; vol. 22, No. 6, March 25, 1944, page 479. Copy in 260-42 ALK.